US 6,789,124 B1

(12) United States Patent
Nasuti et al.

(10) Patent No.: US 6,789,124 B1
(45) Date of Patent: Sep. 7, 2004

(54) MULTI-STANDARD ENHANCED INBAND DATA RECEIVER

(75) Inventors: Tony Nasuti, Norristown, PA (US); Joseph W. Gredone, Chalfont, PA (US); David E. Chodelka, Doylestown, PA (US)

(73) Assignee: General Instrument Corporation, Horsham, PA (US)

( * ) Notice: Subject to any disclaimer, the term of this patent is extended or adjusted under 35 U.S.C. 154(b) by 508 days.

(21) Appl. No.: 09/621,111

(22) Filed: Jul. 21, 2000

Related U.S. Application Data

(60) Provisional application No. 60/145,152, filed on Jul. 22, 1999.

(51) Int. Cl.[7] .............................................. G06F 15/16
(52) U.S. Cl. ...................................... 709/236; 348/573
(58) Field of Search .......................... 725/151, 49, 136, 725/401; 370/465; 709/236, 246; 348/474, 572, 573, 478; 341/155, 158

(56) References Cited

U.S. PATENT DOCUMENTS

| | | | | |
|---|---|---|---|---|
| 4,989,175 | A | * | 1/1991 | Boris et al. .................. 713/401 |
| 5,517,249 | A | * | 5/1996 | Rodriguez-Cavazos et al. . 348/478 |
| 5,784,095 | A | * | 7/1998 | Robbins et al. ................ 725/49 |
| 5,796,423 | A | * | 8/1998 | Robbins et al. ............. 725/151 |
| 5,887,243 | A | * | 3/1999 | Harvey et al. ............... 725/136 |
| 5,966,385 | A | * | 10/1999 | Fujii et al. ................... 370/465 |
| 6,028,642 | A | * | 2/2000 | Rinaldi et al. ............... 348/540 |
| 6,037,932 | A | * | 3/2000 | Feinleib ....................... 348/478 |
| 6,047,032 | A | * | 4/2000 | Zortea et al. .................. 327/37 |
| 6,239,843 | B1 | * | 5/2001 | Gaudreau .................... 348/478 |
| 6,433,835 | B1 | * | 8/2002 | Hartson et al. ............. 348/608 |

FOREIGN PATENT DOCUMENTS

| | | |
|---|---|---|
| EP | 0967801 | 12/1999 |
| WO | 9959336 | 11/1999 |

OTHER PUBLICATIONS

Stephen B. Wicker, "Muting Algorithms Based on the Use of Side Information Generated by Error Control System", IEEE Transaction on Vehicular Technology, vol. 39, No. 2, May 1990.*

Jinan Lin et al., "A Digital High–Performance Multi–Standard Video Data Slicer", IEEE Transactions On Consumer Electronics, US, IEEE Inc., New York, vol. 44, No. 3, Aug. 1, 1998, pp. 1103–1106.

* cited by examiner

*Primary Examiner*—Marc D. Thompson
(74) *Attorney, Agent, or Firm*—Volpe and Koenig, P.C

(57) ABSTRACT

A system for receiving and analyzing at least one inband user data packet within a CATV video signal. The system includes a data detector, a data processor and a memory. The data detector receives video signal samples of the data packet. The data detector includes a data slicer used to determine a threshold level based on a clock sync byte located in the data packet. The threshold level is compared to subsequent video signal samples of the data packet. The data processor determines the destination of the data packet. The memory selectively stores the data packet until it is required by the data processor.

20 Claims, 4 Drawing Sheets

-PRIOR ART-

MULTI-STANDARD ENHANCED INBAND DATA RECEIVER

This application claims the benefit of Provisional Application No. 60/145,152, filed Jul. 22, 1999.

BACKGROUND

The internet is vastly changing the way that businesses and individuals communicate. Businesses typically have the resources to gain access to high-speed, large bandwidth connections to the internet. However, this has not been the case with individuals due to the complexity and expense. CATV networks have begun to fill this void and provide high-speed large bandwidth access to the internet. With the internet becoming more popular for many consumer applications, the use of a CATV network to access the internet has become even more paramount. Accordingly, as the amount of data being transmitted over a CATV network increases with user demand, it is critical that CATV networks be configured to meet those demands.

Current CATV settop terminals utilize dedicated data channels, (such as a service data channel), and the vertical blanking interval (VBI) of an inband video signal in order to send data. The data channels are dedicated to data transmission and are not associated with any inband video channels. Unlike an inband video channel, which originates at a content provider, the dedicated data channels are out-of-band channels which originate at the headend of the CATV system and provide information specific to the CATV system, such as data for the video programming guide, settop terminal addressable data and other control information. Although dedicated data channels provide an effective method for transmitting data to a settop terminal, they force a CATV network provider to reserve a portion of the CATV spectrum solely for data transmission.

A second method for transmitting data is to transmit the data within one of the lines of the VBI, which is part of each frame of an inband video signal. FIG. 1 shows a prior art use of the VBI to transmit data. Embedded within each inband video signal sent over the inband channel is specific information. The complete video picture, called a frame, is made up of two fields each containing 262½ horizontal scan lines, (for an NTSC system). After each field of 262½ horizontal lines is scanned, the scanning beam returns to the top of the screen to begin scanning of the next field. The retrace time is called the VBI. During the VBI, no program video information is included in the composite video signal. The VBI lasts for 21 horizontal lines (or 1333.5 $\mu$S), each line containing a number of bits of information. The VBI may include special reference signals that are located on selected lines of the VBI. Several common signals located in the VBI include the vertical interval test signal on lines 17 and 18, the vertical interval reference signal on line 19, and the closed caption signal on line 21. The VBI, however, is unable to transmit the large amounts of data that are currently required by today's applications.

Generally, current teletext receivers are only capable of receiving a single data format or a single video standard. Different standards typically require different hardware or different hardware components. Therefore, multiple simultaneous standards are not generally supported. Also, the features that inband data receivers provide may be limited to simple data packet reception with little or no data filtering. For example, packet filtering requires intervention from the main system processor.

Accordingly, there exists a need for a system which transmits large amounts of data to support today's data applications and which also provides a CATV network operator with flexibility in managing the network spectrum.

SUMMARY

The present invention comprises a system for receiving high-speed data within a CATV video signal over a CATV network. The system comprises a data detector for receiving the CATV video signal and for extracting the data from said CATV video signal; a data processor for determining the destination address of the data; and a memory, for selectively storing data until required by the data processor. The system is adaptable to different video standards and data formats.

BRIEF DESCRIPTION OF THE DRAWING(S)

DETAILED DESCRIPTION OF THE PREFERRED EMBODIMENT(S)

Figure 1:
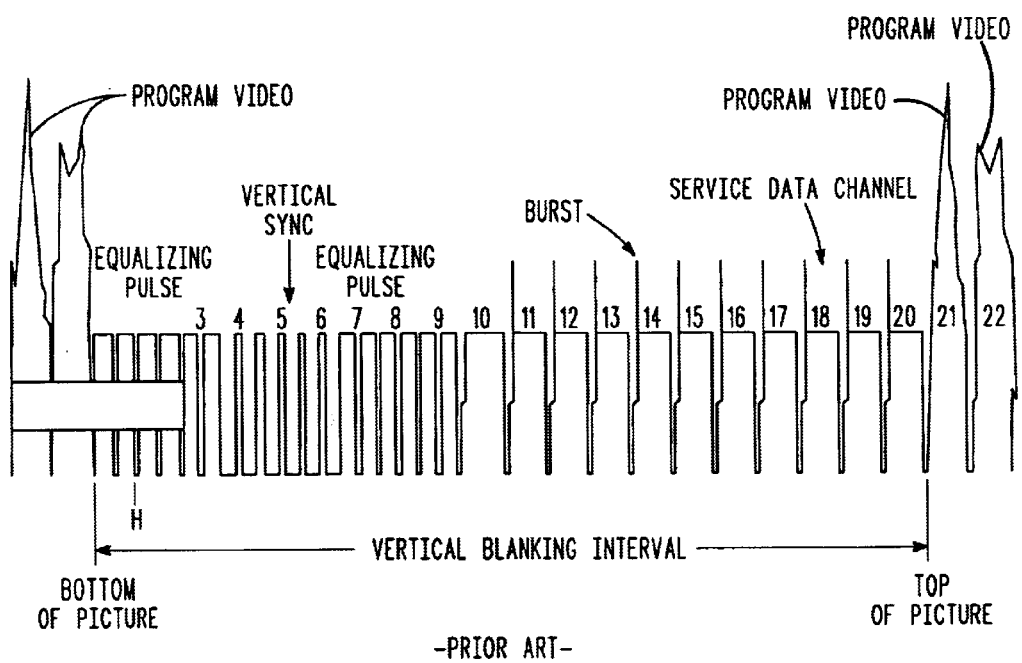
FIG. 1 is a diagram of the vertical blanking interval used in accordance with the prior art.

The present invention will be described with reference to the drawing figures where like numerals represent like elements throughout. The enhanced inband data (EIBD) receiver processes both user data and non-user data. Non-user data includes data associated with the service data channel (SDC). This data has a fixed bit rate, a predetermined format and predetermined framing code.

In contrast to the data associated with SDC, user data can have many different formats, varying bit rates and can use different types of protocols. As will be explained in greater detail hereinafter, the EIBD in accordance with the present invention can accept data in the fixed format associated with SDC and is also configurable to many different types of user data.

Figure 2:
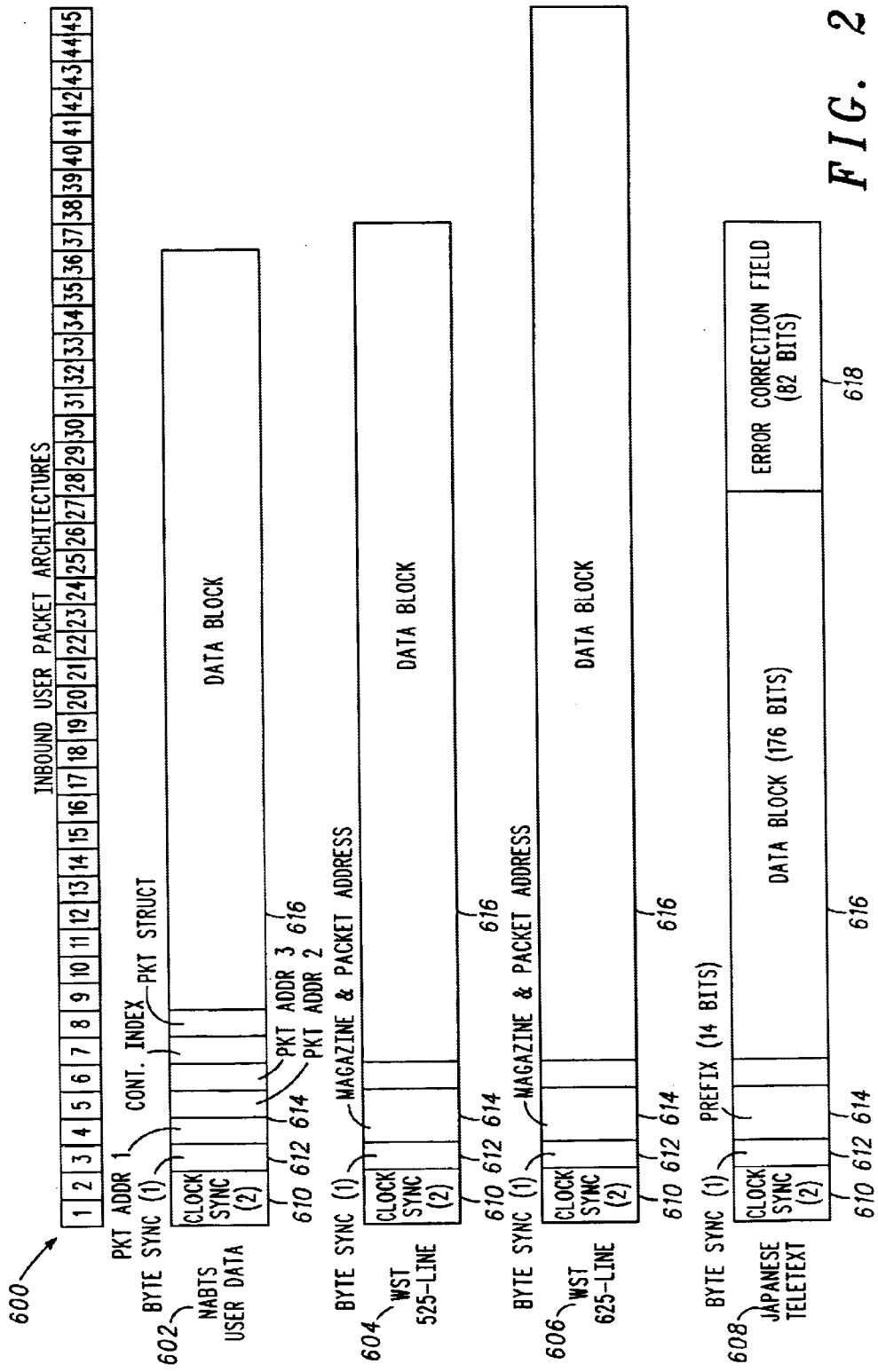
FIG. 2 is the architecture for different types of inband user data packets.

Referring to FIG. 2, the architecture for the different types of inband user data packets processed by the present invention are shown. It should be noted that these architectures are illustrative only and should not be viewed as limiting the invention. The number of bytes 600 in each packet is indicated by the legend along the top of FIG. 2. The EIBD of the present invention may be utilized with the following types of data packet architectures: 1) North American Broadcast Teletext Specification (NABTS) data 602; 2) World System Teletext (WST) data, including both 525-line packets 604 and 625-line packets 606; 3) Japanese Teletext data 608; and 4) SDC data (not shown). As shown, each type of data packet architecture includes a clock sync 610, a framing code 612, a packet header 614 and a payload 616. For the convenience of explanation, the bytes that are Hamming encoded are shaded. Japanese Teletext data 608, which is not Hamming encoded, includes an error correction field 618.

The first two bytes of each type of user data packet architecture comprise the clock sync 610, also known as the "run-in". These two bytes comprise an alternating pattern of ones and zeros. When this pattern is passed through a low pass filter, a DC level signal is obtained, which establishes a data threshold. Video samples having a value over the threshold are considered to be a logical one, and video samples having a value under that threshold are considered to be a logical zero. As will be explained in greater detail hereinafter, the clock sync 610 is used to provide that threshold value for each packet of data. It should be noted that a single packet of data is included in each video line.

The framing code 612 permits the EIBD 400 to determine the byte boundaries. There are generally two types of framing codes 612: 1) byte sync; and 2) unique word. A byte sync, as shown in FIG. 2, is a single byte framing code utilized with user data packet architectures. A unique word, is a four byte framing code utilized in conjunction with the transmission of non-user data packet architectures, such as SDC data.

The packet header 614 is used to distinguish different logical streams of data. These streams may ultimately be destined for separate users, or multiple applications for a single user, such as internet browsing, updating a video program guide, online gaming, etc. The data block 616, or payload, is the data which will be used by a particular application.

Figure 3:
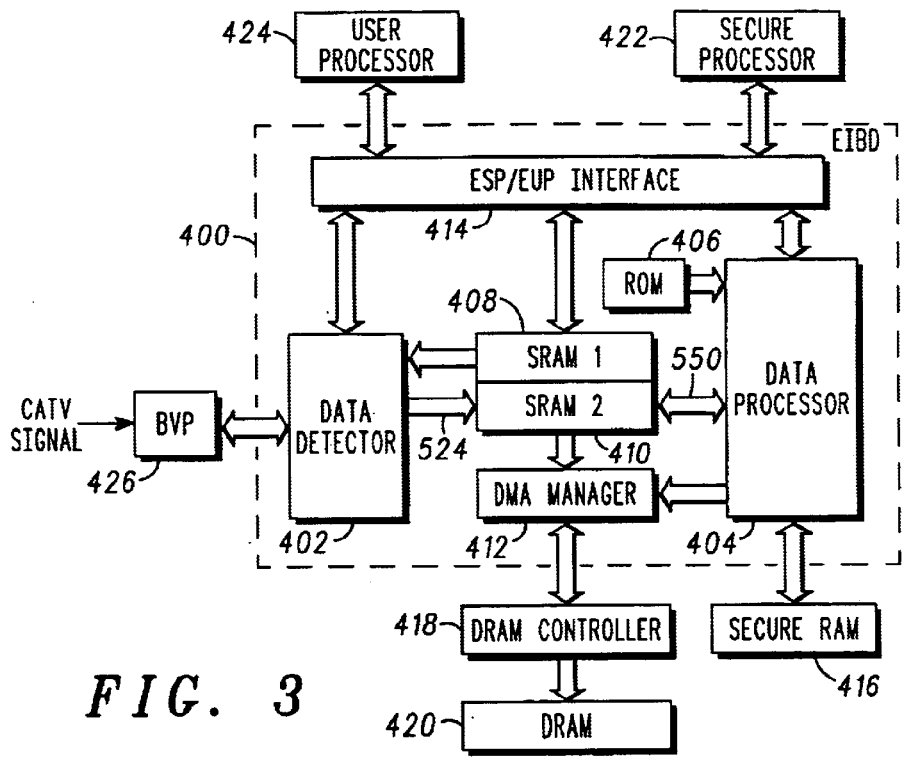
FIG. 3 is a block diagram of the EIBD made in accordance with the present invention.

Referring to FIG. 3, a block diagram of the EIBD 400 made an accordance with the present invention is shown. The EIBD 400 includes a data detector 402, a data processor 404 (including an associated ROM 406 and secure RAM 416), two SRAMs 408, 410, a DMA manager 412 and a processor interface 414. The EIBD 400 accepts the output from a baseband video processor (BVP) 426. The EIBD 400 also interfaces with several external devices including a user processor (EUP) 424, a secure processor (ESP) 422 and a DRAM controller 418, which is further coupled to a DRAM 420.

The BVP 426 accepts the downstream CATV video signal from the CATV transmission plant (not shown), processes the signal and outputs a digitized video signal at 27 Mbps. As is well known by those skilled in the art, the processing performed by the BVP 426 includes descrambling of the input CATV video signal; upsampling of the input CATV video signal from 13.5 Mbps to 27 Mbps; and generation of several control signals for the EIBD 400, including, but limited to, video line number, run-in window (the location in a video line where the clock sync 610 is expected to be found), odd or even field status and video "locked" status. These signals are output from the BVP 426 to the data detector 402.

The EIBD 400 utilizes two basic modes of operation: 1) acquisition mode; and 2) video lock mode. During acquisition mode, the EIBD 400 only searches for high-speed SDC data that is necessary for video lock to occur. The EIBD 400 searches all incoming video samples for SDC data. As will explained in greater detail hereinafter, once the SDC data is detected, it is used to generate a timing reference signal that allows the BVP 426 to synchronize to the incoming video signal and achieve video lock mode.

Once the BVP 426 is synchronized to the incoming video signal and enters video lock mode, the BVP 426 provides the EIBD 400 with a narrow run-in window, thereby minimizing the probability of false detection. During video lock mode, the EIBD 400 may search for all types of inband data, not only SDC data. The EIBD 400 receives descrambled video and the run-in signal from the BVP 426, which represents a narrow search window for locating the inband data. The search window is active on each video line during the time corresponding to the inband clock sync 610 and framing code 612, as will be explained in greater detail hereinafter with reference to FIG. 4.

Figure 4:
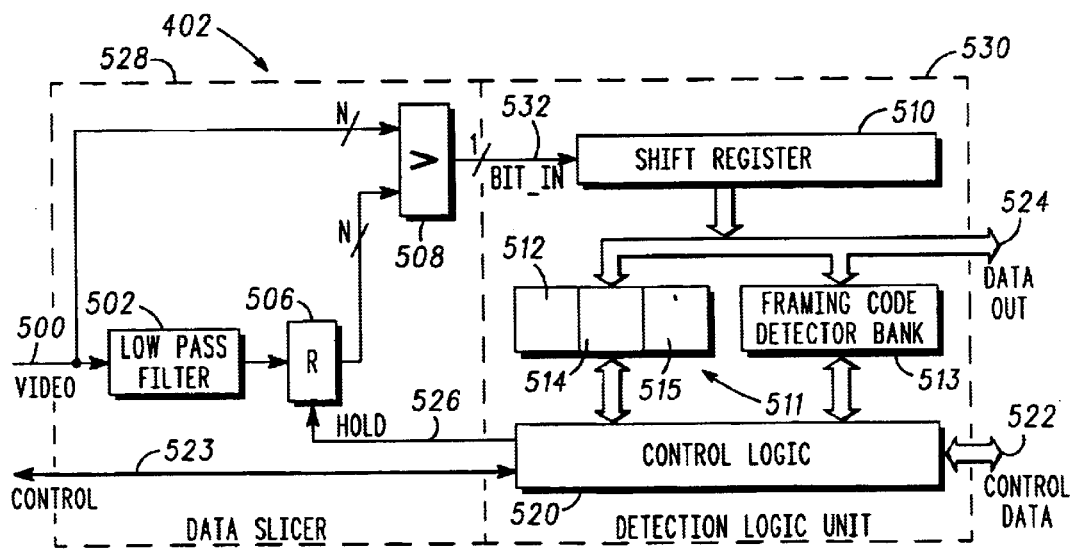
FIG. 4 is a block diagram of the EIBD data detector.

Referring to FIG. 4, the data detector 402 comprises a data slicer 528 and a detection logic unit 530. The data slicer 528 operates on the clock sync 610 of a data packet and the detection logic 530 operates on both the clock sync 610 and on the framing code 612. The data slicer 528 comprises a low pass filter 502, a register 506 and a comparator 508.

With respect to the data slicer 528, the incoming digitized video 500 from the BVP 426 is passed to the low pass filter 502 and the comparator 508. The low pass filter 502 filters the clock sync 610 of the incoming video samples to determine the threshold level against which the subsequent video samples of the data packet will be compared. The threshold is buffered in the register 506 and then forwarded to the comparator 508. The comparator 508 compares the threshold level output by the register 506 with each video sample subsequent to the clock sync 610. Those video samples having an amplitude greater than the threshold level will be determined to be a logical one, and those video samples having an amplitude which is less than the threshold will be considered to be a logical zero. These binary samples 532 are output to the detection logic unit 530.

The detection logic unit 530 includes a shift register 510, a clock sync detector bank 511 comprising a plurality of comparator circuits 512, 514, 516, a framing code detector bank 513, a control logic unit 520, two control buses 522, 523 and a data bus 524. The detection logic unit 530 performs clock sync detection on the incoming binary samples 532 which are shifted into the shift register 510 at 27 Mbps. The clock sync detector 511 uses each of the comparator circuits 512, 514, 516 to search for a specific pattern within the shift register 510. The pattern is dependant on the relationship between the data bit rate of a given data type and the 27 Mbps video sampling rate. For example, referring to Table 1, each type of data has a different bit rate.

TABLE 1

| Data Type | Bit Rate (bits/sec) |
|---|---|
| 525-line (NABTS, WST, Japanese) | 5727272 |
| 625-line WST | 6937500 |
| SDC (525-line or 625-line) | 5400000 |

In this example, the first comparator circuit 512 will search for 525-line NABTS, WST and Japanese data at a bit rate of 5.72 Mbps; the second comparator circuit 514 will search for 625-line WST data at a bit rate of 6.93 Mbps; and the third comparator circuit 516 will search for SDC data at a bit rate of 5.4 Mbps. If the binary samples 532 shifted into the shift register 510 have one of the aforementioned bit rates, one of the comparator circuits 512, 514, 516 will detect a matching pattern. That comparator circuit outputs a control signal to the control logic unit 520 which then outputs a signal 526 to the register 506 to hold the threshold level. Depending upon which comparator circuit 512–516 has found the matching pattern, the control circuit 520 will know the data bit rate of the data in the shift register 510. The register 506 will hold the threshold level for the remainder of the packet.

During acquisition mode, only the third comparator circuit 516 which searches for SDC data is enabled. The other two comparator circuits 512, 514 are not enabled until the EIBD 400 enters video lock mode. Once a matching pattern is found, the data threshold level, also known as the data slice level, and the bit edges become known. Detection then shifts from clock sync 610 detection to frame sync detection via control signal 526 sent from control logic unit 530 to register 506. The data threshold level is subsequently held constant for the remainder of the packet and is used to determine the remaining data bit values. A modulo counter (not shown) is used to track the relative bit edge position within the incoming video samples. Based on the value of the modulo counter, the center-most video sample within each bit time is compared to the data threshold level and the result (i.e., a logic one or a logic zero) represents the data bit value.

Framing code detection primarily comprises correlating the incoming binary with the expected framing code. If the output exceeds a certain threshold, then framing code detection is declared. Framing code detection is performed within the framing code detector bank 513. The framing code detector bank 513 comprises four separate correlators 517*a–d*, each correlating with the framing code of a particular subchannel. Since the EIBD 400 in accordance with the present invention comprises four subchannels, each subchannel potentially having a different framing code, four framing code correlators are required. It should be recognized by those skilled in the art that if additional subchannels are desired, additional framing code correlators would be added. Also, if a multi-code framing correlator is used, the functions of the plurality of framing code correlators 517*a–d* can be performed by a single multi-code framing code correlator. In the present invention, three of the framing code correlators are 8 bit wide correlators, which correspond to the user subchannels. One of the framing code correlators 517*d* is 32 bits wide for correlating with the framing code of the SDC data, which is 32 bits.

Figure 4A:
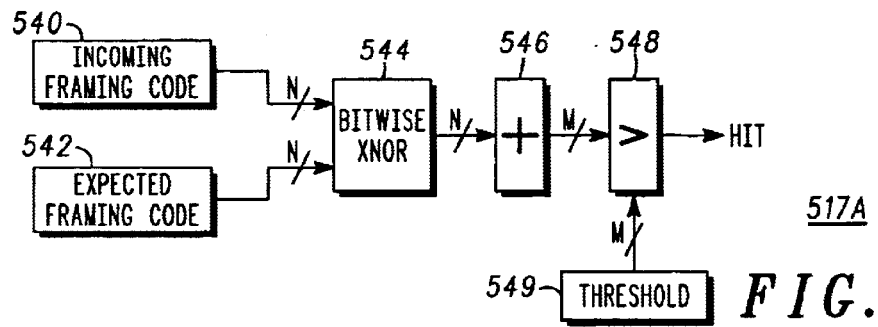
FIG. 4A is a block diagram of the EIBD framing code correlator.

Referring to FIG. 4A, the framing code correlators 517*a–d* are shown in greater detail. The framing code correlator 517*a* comprises inputs for an incoming framing code 540 and an expected framing code 542, a bitwise XNOR 544, an adder 546, a comparator 548 and a threshold register 549. Although only one framing code correlator 517*a* is shown, all of the correlators are configured and operate in the same manner. The framing code correlator 517*a* compares the incoming framing code 540, which is output from the shift register 510, with an expected framing code 542. The expected framing code 542 is a configurable value which is set by the EUP 424 for a particular subchannel. For example, in hexadecimal notation, the expected framing code 542 for a first subchannel may be E7, and an expected framing code 542 for a second subchannel may comprise A6. Both the incoming framing code 540 and the expected framing code 542 are input into a bitwise XNOR 544 which compares the two framing codes 540, 542 on a bit-by-bit basis to determine how many of the bits are the same value. The output comprising N bits is forwarded to an adder 546 which adds up the number of bits that have the same value. This output comprising M bits is forwarded to the comparator 548 which compares the output of the adder 546 with a threshold value from the threshold register 549. If the number of bits exceeds the threshold value stored in the threshold register 549, it has been determined that the framing code 612 has been detected. The threshold of the correlator 517 is configurable in order to permit the user to trade-off better sensitivity in noise versus more protection against false detection. Once framing code detection occurs, the data byte boundaries become known. From this point on, the data can be packaged into bytes or words and transferred via the data bus 524 to SRAM 2 410. The control unit 520 outputs a control signal 522 which indicates the data type to be output from the shift register 510. The data in the shift register 510 is subsequently output on the data bus 524.

In order to determine the lines within a video frame that have data to be detected, the data detector 402 utilizes a line directory consisting of a bit map that defines which lines outside the VBI contain data. The data detector 402 will only look for data within the VBI and on the active video lines contained in the field specified by the line directory. The line directory function comprises two registered blocks: 1) line directory mode register; and 2) line directory bitmap. The line directory mode register defines which fields to look for data, and basically comprises four choices: 1) none; 2) odd; 3) even; and 4) both. The line directory bitmap defines which active video lines to look for data.

For example, if the mode register enables an odd field and the line directory bitmap enables lines 50–60, the EIBD 400 searches for data on lines 50–60 on the odd field only, and searches for data in the VBI of both fields.

Upon initialization of the EIBD 400, the line directory information is sent from the CATV network operator at the headend to the EIBD 400, which is stored in memory (not shown) associated with the EUP 424. The line directory information exists for each channel in the spectrum. When the settop terminal is tuned to a current channel, the EUP 424 forwards the portion of the line directory for the current channel SRAM 1 408, where it is stored. The control logic unit 520 utilizes this information to enable the data slicer 528 only on those lines which are indicated by the line directory as having data. Additionally, the run-in window signal output from the BVP 426 on the control bus 523 indicates the location where clock sync 610 is to be found. Although the line directory informs the EIBD 400 that there is data in a particular video line, it does not give additional information about the type of data on the video line.

The data output on the data bus 524 from the data detector 402 is input into SRAM 2 410. SRAM 2 410 operates to buffer the data 524 output from the data detector 402 prior to being acted upon by either the data processor 404 or the DMA manager 412.

The received data is transferred to DRAM 420 using the DMA manager 412, thereby minimizing EUP 424 involvement. The DMA manager 412 is fully configurable such that the data can be transferred to any DRAM 420 memory location. The rate at which the EUP 424 is notified of incoming data is fully configurable such that the EUP 424 can trade-off buffer size against data latency. At one extreme, the DMA manager 412 can be configured to interrupt the EUP 424 after each and every data packet received. At the other extreme, the DMA manager 412 can be configured to interrupt the EUP 424 or once per field. The former case allows low latency and low buffering requirements at the expense of higher processor overhead. The latter case causes higher latency and buffering requirements with the advantage of little processor overhead. All cases between these two extremes are also supported.

SRAM 2 is a buffer RAM used to buffer incoming data. It holds the data so that it can be processed by the data processor 404 prior to transferring it to the EUP 424. The data processor 404 acts upon the data buffered in the SRAM 2 410 and determines whether to discard the data or further process the data. The data processor 404 also performs several integrity checks on the data to determine whether there are any errors and, if there are errors, whether they are correctable.

Various parameters of the EIBD 400 are configured from both the EUP 424 and the ESP 422. The EUP 424 typically handles configuration parameters of the EIBD 400 related to user applications. The ESP 422 handles security aspects of the EIBD 400 which are not accessible by the user. All received data to be transferred to the EUP 424 is done through the DMA manager 412 and the DRAM controller 418 into DRAM 420.

Due to the large bandwidth of data that can be received by the EIBD 400, it is desirable that a certain amount of processing is performed in hardware in order to minimize the load on the user processor 424. The data processing performed in hardware depends on the subchannel configuration and the type of data received, but may consist of any of the following: 1) network routing filter; 2) data integrity filter; 3) null data filter; 4) service code filter for access control; and 5) data decryption.

Figure 5:
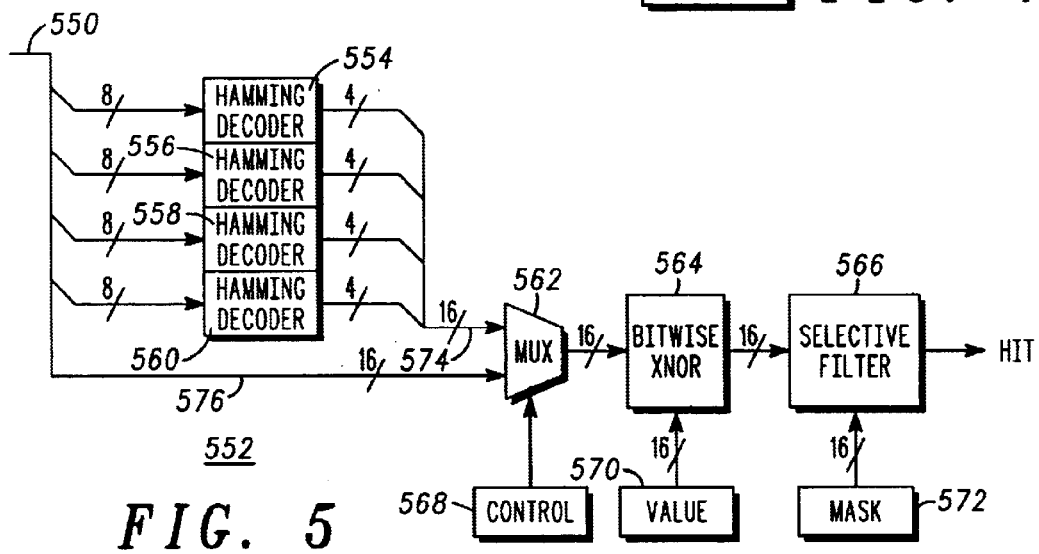
FIG. 5 is a block diagram of a network routing filter.

Referring to FIG. 5, the data processor 404 includes a network routing filter 552 having a plurality of Hamming decoders 554, 556, 558, 560, a multiplexer 562, a comparator 564 and a filter 566. There are also control registers 568, 570, 572 associated with the multiplexer 562, the comparator 564 and the filter 566 respectively. These control registers 568, 570, 572 are ultimately defined by the EUP 524.

It should be understood that the present invention comprises a plurality of filtering steps, any one of which may result in discarding of the data. For example, if the EIBD 400 does not detect the Hamming code 612, it will discard the data packet. This series of filtering ensures that only proper data is passed on to the particular application.

Since some of the data packet headers being processed by the EIBD 400 in accordance with the present invention may be Hamming encoded or non Hamming encoded (as shown in FIG. 2), the network routing filter 552 provides for two data paths; one path 574 for Hamming encoded data and one path 576 for non-Hamming encoded data. As those skilled in the art should realize, Hamming encoding provides robustness against errors which may be introduced into the data during transmission. Hamming coding permits detection of up to 2 bit errors and correction of 1 bit errors. Data packets passing through the Hamming encoded data path 574 are passed from the input 550 to the Hamming decoders 554–560 and are output to the multiplexer 562. Non-Hamming encoded data is passed from the input 550 directly to the multiplexer 562 through the non-Hamming encoded path 576.

The control register 568 controls the multiplexer 562 to select one of the inputs 574, 576. If the data is Hamming encoded, the multiplexer 562 will select the Hamming encoded path 574. In the case of non-Hamming encoded data such as Japanese Teletext 608, the multiplexer will select the non-Hamming encoded data path 576. The EUP 424 sets this value based on the data that is required by the particular user application. The control register 568 knows the data type since the data type was determined by the detection logic unit 530, (as previously described with reference to FIG. 4).

The output from the multiplexer 562 comprises 16 bits of data that are fed to the comparator 564. The bitwise XNOR 564 compares the incoming 16 bits of data to a value stored in the value register 570, which pertains to a particular logical stream of data related to an application. By way of further configurability, since the network routing filter 522 will be utilized for a plurality of different data packets architectures 602, 604, 606, 608, the network routing filter 522 is configurable to the packet header 614 for the particular packet architecture. For example, NABTS data packet architecture 602 utilizes a 3 byte packet header; whereas Japanese Teletext data packets 608 utilize 14 bits for the packet header. The output from the bitwise XNOR 564 is input to a selective filter 566. Depending on the data type being analyzed, the filter 566 blocks out the bits that are unnecessary for analysis. For example, for Japanese Teletext data packets 608, the mask register 572 will define a 14 bit mask to the filter 566; the remaining 2 bits will be masked and disregarded. As a further example, packets having the NABTS data packet architecture 602 will have a 12 bit address after Hamming decoding. Accordingly, the mask register 572 will define a 12 bit mask to be used by the filter 566 and the remaining 4 bits will be disregarded. The output from the selective filter 566 is a "hit" if the masked comparison finds that all of the non-masked bits match.

Figure 6:
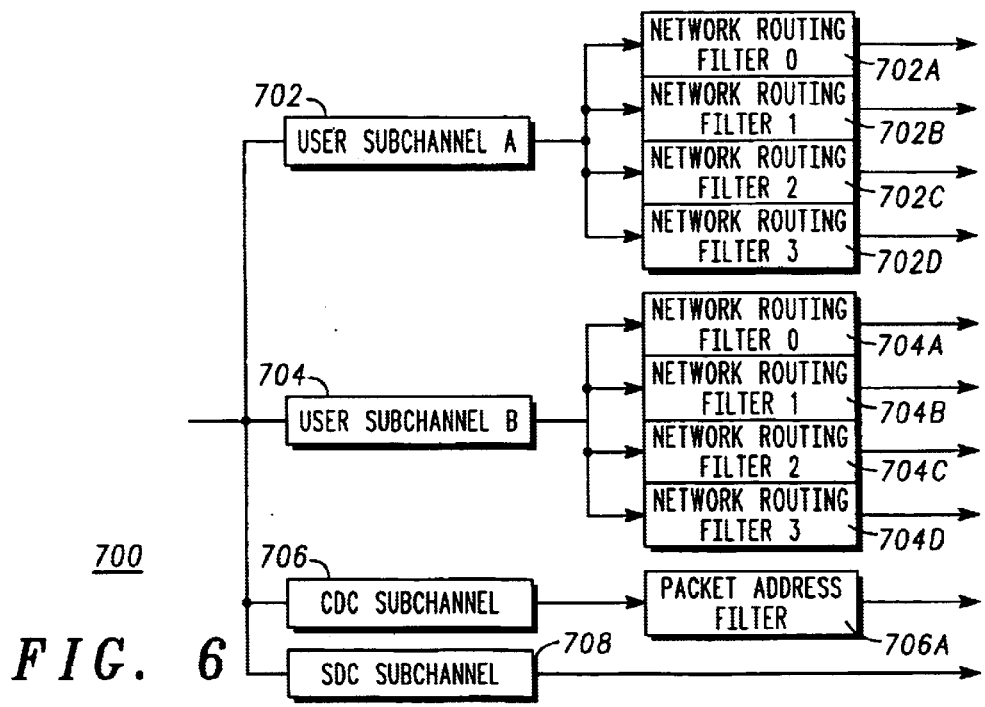
FIG. 6 is a flow diagram of the EIBD logical subchannels.

Referring to FIG. 6, the logical subchannel structure 700 used in accordance with the preferred embodiment of the present invention is shown. The logical subchannel structure 700 includes four basic subchannels: 1) user subchannel A 702; 2) user subchannel B 704; 3) CDC subchannel 706; and 4) SDC subchannel 708. As was previously described the data rate and framing code of the incoming data determine the subchannel 702–708 to which the incoming data should be routed.

As aforementioned with reference to the framing code 612, when a particular application is initiated, a framing code 612 will be associated with that application. As an example, a framing code B7 may be associated with user subchannel A 702 which supports an application for internet browsing. When this framing code is detected, the data associated with framing code B7 will be forwarded to user subchannel A 702. In such a manner, different applications may be associated with either of the user subchannels A, B 702, 704.

The CDC subchannel 706 is a subchannel with a fixed bit rate and fixed framing code so that any data associated having the bit rate and framing code of the CDC subchannel 706 will be forwarded to the CDC subchannel 706. The CDC subchannel 706 is designed to receive inband CDC data. Since the CDC data format is fixed, the CDC subchannel 706 requires much less configuration than the user subchannels 702, 704 and is much less flexible. The subchannel 706 is equivalent to a user subchannel with the following configuration: 1) network routing filter configured for packet address filtering (i.e., 12 bit mask); 2) NABTS processing enabled; and 3) specific data processing enabled.

Like the user subchannels, the CDC subchannel 706 will default to always look for data in the VBI unless a line directory indicates that data exists in active video. The CDC subchannel 706 is only active during video lock mode. The packet address filter 706a for the CDC subchannel 706 performs the same function as the network routing filters 702a–n, 704a–n except that the filter 706a is fixed since the data type, format and bit rate input through the CDC subchannel 706 is fixed.

If none of the framing codes associated with any of the subchannels 702–708 are detected by the EIBD 400, the data is discarded.

The service data channel (SDC) subchannel 708 is designed to receive Motorola high-speed SDC data that is configurable by both the ESP 422 and the EUP 424. Unlike the other subchannels, the SDC subchannel 708 operates during both acquisition mode and the video lock mode. The SDC subchannel 708 is used to acquire the necessary information for synchronization to occur. In acquisition mode, the SDC subchannel 708 searches the entire video field for data. Once video lock is obtained, the SDC subchannel 708 restricts its search for data to the VBI, regardless of the line directory. Another difference between the SDC subchannel 708 and other subchannels is that SDC data uses a "unique word" as its framing code instead of byte sync.

Each user subchannel 702, 704 is configured to be able to process a single data type at a time. Having several user subchannels 702, 704 permits the present invention to provide flexibility in supporting a plurality of different applications. For example, user subchannel A 702 may support a plurality of applications using the NABTS data packet architecture 602. The different logical streams of data will be routed by the network routing filters 702a–n to the destination application as was explained hereinbefore with reference to FIG. 5.

By way of example, since the user subchannels 702, 704 are initially configured to receive a single data type and if user subchannel A 702 is configured to receive the NABTS data packet architecture 602, user subchannel A 702 will be unable to simultaneously process Japanese Teletext data packet architecture 608. Accordingly, this architecture 608 may be processed by user subchannel B 704. It should be understood by those in the art that although only two user subchannels 702, 704 were described herein, many subchannels may be provided according to need. Additionally, since the user subchannels 702, 704 are configurable, if the user desires both user subchannel A 702 and user subchannel B 704 to process Japanese Teletext data packet architecture 608, the EIBD 400 may be configured in such a manner. The user subchannels 702, 704 can be configured to receive many different data formats. For example, the user subchannels may be configured to receive two distinct data formats, or maybe combined to provide a larger number of data streams of the same format.

User subchannels A and B 702, 704 receive data to be used by applications in the EUP 424. The user subchannels A, B are only active during video lock mode. Each user subchannel is capable of receiving data inserted on any combination of video lines up to a full-field of data. Data can be receive on either the odd video field, the even video field or both fields. By default, the subchannels 702, 704 always search for data on the VBI portion of both fields.

Each user subchannel can be independently configured to process the following types of data: a) "raw" data (including WST, Japanese Teletext, etc.); b) generic NABTS; and c) Motorola NABTS format. Raw data refers to any type of data that does not conform to the NABTS standard for inband data but contains at least 16 bits of clock sync and at least 8 bits of byte sync. Although many international teletext formats, such as WST and Japanese Teletext are well-defined data formats, they are classified as raw data for the purposes of the EIBD receiver. The processing performed on raw data is limited to network filtering. NABTS data refers to data that conforms to the NABTS standard at the data packet layer and optionally at the data group layer. Besides network filtering, NABTS subchannels provide data integrity filtering.

No data processing is performed on the SDC subchannel 708. The subchannels 702–708 permit the EIBD 400 to be configured to simultaneously receive different data types. Although it is possible for a data packet on a given video line to be detected on multiple subchannels, the EIBD 400 will process only one copy of each received packet as if it were received in a single subchannel according to the following priority: 1) SDC subchannel 708; 2) CDC subchannel 706; 3) user subchannel A 702; and 4) user subchannel B 704.

Due to the embedded processor design, the EIBD 400 can provide even more sophisticated data processing than the network routing filtering discussed thus far. High-level functions such as forward-error correction (FEC), data decryption, authentication, and access control can all be implemented in the EIBD hardware, thereby further minimizing system processor loading.

What is claimed is:

1. A system for receiving and analyzing at least one inband user data packet within a CATV video signal, the data packet including at least one clock sync byte, the system comprising:
   a data detector for receiving video signal samples of the data packet, whereby the data detector includes a data slicer for determining a threshold level based on the clock sync byte and comparing the threshold level to subsequent video signal samples of the data packet;
   a data processor for determining the destination of the data packet; and
   a memory for selectively storing the data packet until required by the data processor.

2. The system of claim 1 whereby those subsequent video signal samples having a level greater than said threshold level are determined to be logical one binary samples, and those subsequent video signal samples having a value less than said threshold level are determined to be logical zero binary samples.

3. The system of claim 2 whereby said data detector further comprises a detection logic unit for determining the data rate of said binary samples.

4. The system of claim 3 whereby said data detector further comprises a control logic unit for determining the data type from said data rate.

5. The system of claim 1 whereby said data detector further comprises a framing code detector for detecting a framing code within said data packet.

6. The system of claim 5 whereby said framing code detector comprises at least one framing code correlator for correlating the framing code of said data packet with an expected framing code and determining the number of data bits in said data packet which are equal.

7. The system of claim 6 whereby the framing code correlator further comprises a comparator for comparing said number of equal data bits with said threshold level and outputting a control signal if said number of equal data bits exceeds said threshold level.

8. The system of claim 1 wherein said data processor includes at least one network filter for routing said data packet.

9. The system of claim 8 whereby said network filter comprises a first data path for handling data packets which are Hamming encoded, a second data path for handling data packets which are non-Hamming decoded, and a switch for selecting between said first and second data paths.

10. The system of claim 9 whereby said network filter further comprises a comparator for comparing data bits in a header of a data packet with data bits in a predetermined address and determining the number of data bits which are equal.

11. The system of claim 1 further comprising a dynamic random access memory (DRAM) and a DRAM controller for selectively storing data and retrieving data in accordance with a predetermined interrupt schedule.

12. The system of claim 1 wherein said data packet includes North American Broadcast Teletext Specification (NABTS) data.

13. The system of claim 1 wherein said data packet includes World System Teletext (WST) data.

14. The system of claim 1 wherein said data packet includes Japanese Teletext data.

15. The system of claim 1 wherein said data packet includes service data channel (SDC) data.

16. A system for receiving and analyzing at least one inband user data packet within a CATV video signal, the data packet including at least one clock sync byte, the system comprising:
- a sampler for sampling the CATV video signal and outputting video signal samples of the data packet; and
- a data slicer for receiving the video signal samples, determining a threshold level based on the clock sync byte and comparing the threshold level to subsequent video signal samples of the data packet.

17. The system of claim 16 wherein said data packet includes North American Broadcast Teletext Specification (NABTS) data.

18. The system of claim 16 wherein said data packet includes World System Teletext (WST) data.

19. The system of claim 16 wherein said data packet includes Japanese Teletext data.

20. The system of claim 16 wherein said data packet includes service data channel (SDC) data.

* * * * *